(12) United States Patent
Overland

(10) Patent No.: US 7,594,667 B2
(45) Date of Patent: Sep. 29, 2009

(54) DEVICE IN A SHOPPING BASKET WITH WHEELS

(76) Inventor: Roald Overland, Rustå 38, Sauda (NO) NO-4200

( * ) Notice: Subject to any disclaimer, the term of this patent is extended or adjusted under 35 U.S.C. 154(b) by 0 days.

(21) Appl. No.: 12/035,926

(22) Filed: Feb. 22, 2008

(65) Prior Publication Data
US 2008/0309036 A1 Dec. 18, 2008

(30) Foreign Application Priority Data
Jun. 13, 2007 (NO) .................................. 20073002
Dec. 11, 2007 (SE) .................................. 0702746

(51) Int. Cl.
*B62D 39/00* (2006.01)
(52) U.S. Cl. .......................... 280/33.992; 280/47.371; 16/110.1; 403/113; 403/117
(58) Field of Classification Search ............ 280/33.992, 280/655.1, 47.36, 47.371; 16/110.1, 405, 16/406, 408, 422, 425, DIG. 24; 403/84, 403/85, 88, 91, 92, 93, 101, 103, 113, 117
See application file for complete search history.

(56) References Cited
U.S. PATENT DOCUMENTS
2,724,598 A * 11/1955 Knarzer ................ 280/47.371
2,966,365 A * 12/1960 Kortum ................ 280/47.371
5,141,124 A * 8/1992 Smith et al. ................. 220/831
5,915,723 A * 6/1999 Austin ........................ 280/651
D533,327 S * 12/2006 McCaskill ................... D34/17
D563,620 S * 3/2008 Dong .......................... D34/19

* cited by examiner

*Primary Examiner*—Christopher P Ellis
*Assistant Examiner*—John D. Walters
(74) *Attorney, Agent, or Firm*—Potomac Patent Group PLLC

(57) ABSTRACT

A device in a stackable shopping basket of the type that at the underside thereof is provided with wheels and that at the upper part thereof has a draw-handle hingedly fixed to the upper edge of the basket. The handle is larger/longer in comparison with conventional such shopping-basket handles and has the purpose of making it possible to pull the basket behind rolling on the wheels in connection with walking through, for instance, a shop where purchase is made. The handle which is in the form of a U-shaped frame has, at the respective ends thereof, a first part of a deflection limiter formed as crescent-like circle segments that are arranged around the hinged ends and intended to co-operate with a corresponding second part of the deflection limiter that prevents pivoting motion of the circle segments past a certain arc angle and being in the form of two stop blocks, which are fixedly arranged adjacent to the edge of the shopping basket at the attachment points of the hinged ends.

3 Claims, 5 Drawing Sheets

US 7,594,667 B2

DEVICE IN A SHOPPING BASKET WITH WHEELS

TECHNICAL FIELD

Figure 1A:
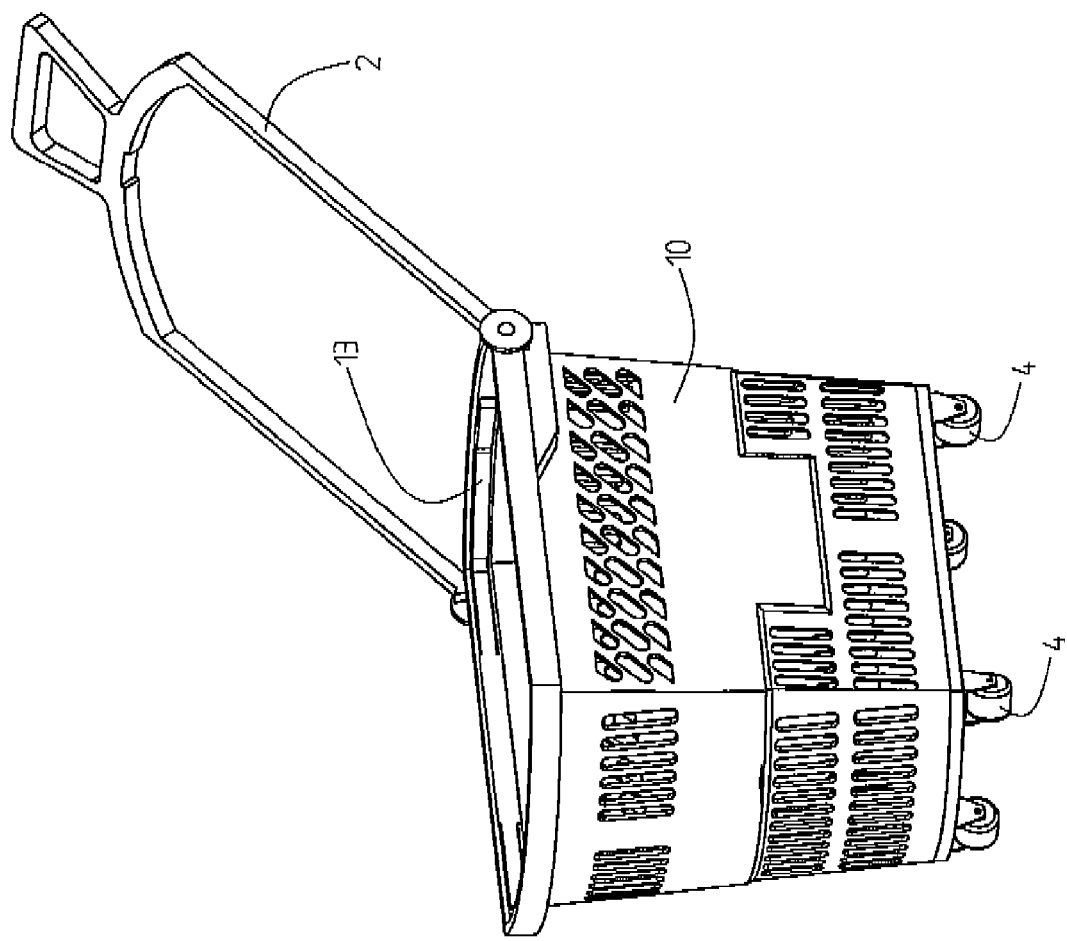

The present invention relates to a device in a shopping basket of the type that resembles a usual basket but that comprises wheels arranged on the underside thereof as well as a handle arranged at the upper part thereof, which basket is larger/longer in comparison with conventional ones and which has the purpose of making it possible to pull the basket behind rolling on the wheels when walking through a shop, where purchase is made. More specifically, the invention relates to a device for providing a draw-handle with a stop.

PRIOR ART

The handles of shopping baskets known today of the type mentioned above all suffer from the fact that they, in connection with the customer putting in goods or the like and being released in the extended state, fall down to a more or less horizontal state. Therefore, the customer using the basket has, when he or she desires to resume the pulling of the basket, to lean down in order to catch the handle. This is experienced as troublesome by the aged and more or less handicapped, who may have difficult to bend down. Others have tried to solve the problems by providing the draw-handle with rectangularly shaped support elements arranged closest to the basket, the purpose of which has been to rest against the edge of the basket in order to stop the handle so as to hold the same at an angle of 45° to the floor when the basket is standing on the wheels thereof. However, it has turned out that this solution does not hold in practice, and that the draw-handle after a short time of use still falls down in a manner not intended.

THE INVENTION IN BRIEF

According to the invention, the hinge mechanism that allows the pivotal motion of the handle is provided with a stop construction, which is arranged between the edge of the basket and the draw-handle and which stops the handle in a desired position in a state that corresponds to a state of rest of the handle as well as in a state that corresponds to an in-use state, in the latter case without falling down to a horizontal state. The stop construction is manufactured from a hard plastic material, preferably harder than the material of the basket itself. The two parts of the handle that should be pivotably fixed to the basket are constructed so that these will abut directly against the support construction with the handle part at the desired angle when the same is raised as well as resting in line with the edge of the basket in the state of rest, accordingly having a certain possible arc angle of motion. The handle is attached to the basket by a rivet, however with the stop construction in question inserted under the edge of the basket and fixed by the same rivet. Tests have shown that the solution works very well and keeps the handle stably upright at the fixed angle when it is used in the extended state when the basket is used and pulled.

In a further developed embodiment of the invention, it has been found that it is no longer needed that the basket has an edge on the outside of the basket frame, which is such that the handle can rest against the same in both directions. This embodiment simultaneously means that the draw-handle no longer needs to be adapted to the edge of the basket but this can be designed more freely.

Figure 1B:
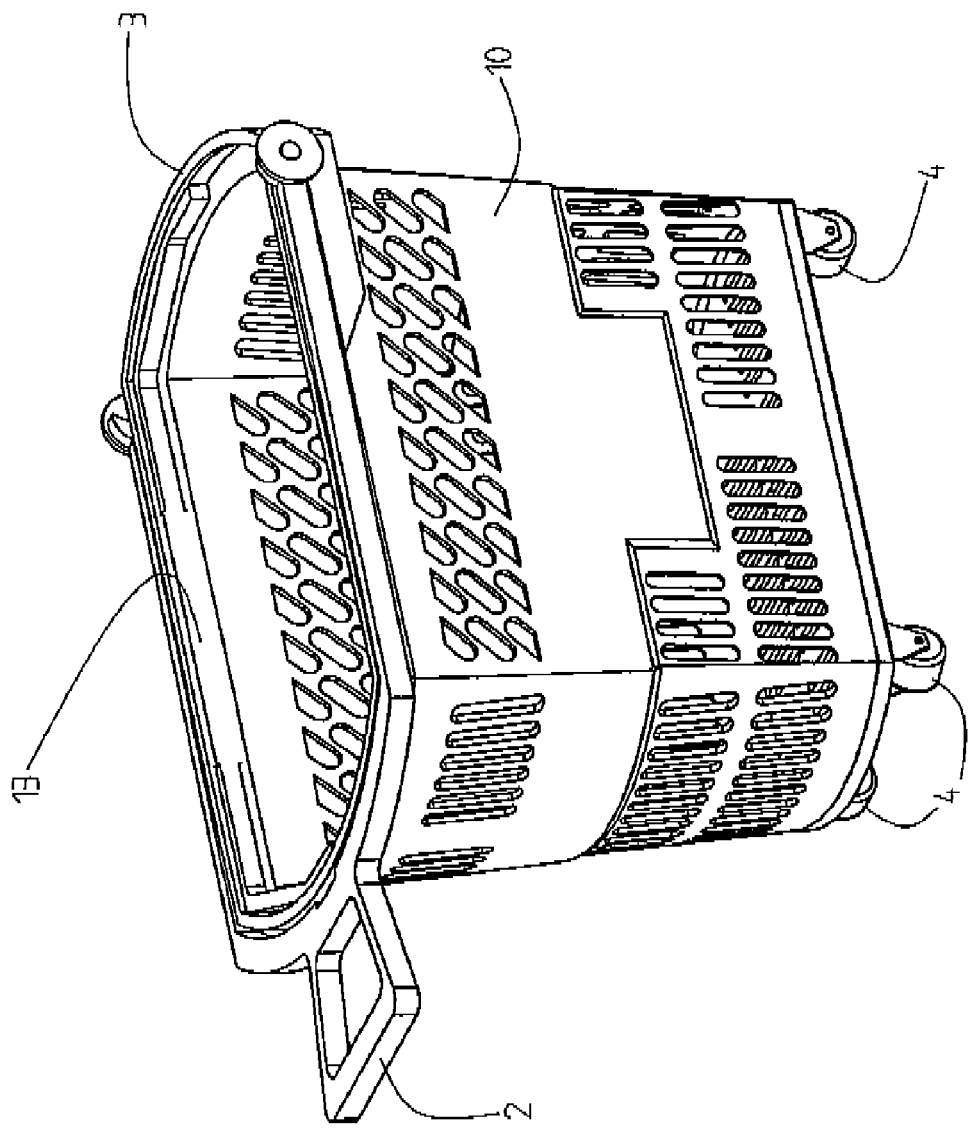
Figure 2A:
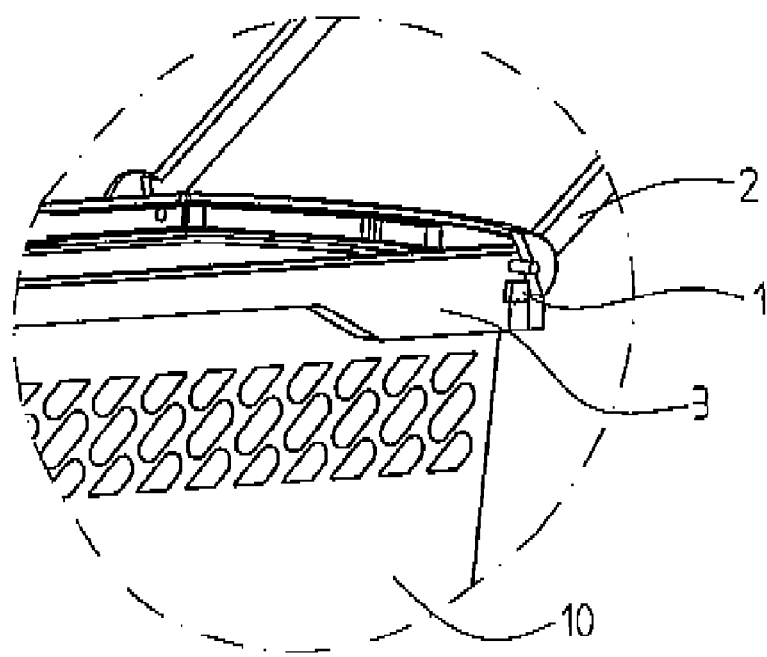
Figure 2B:
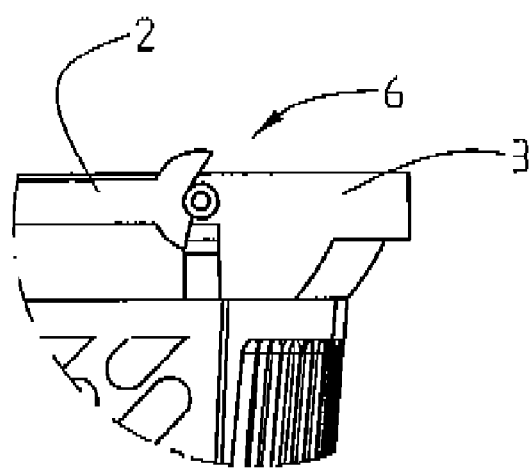
Figure 3:
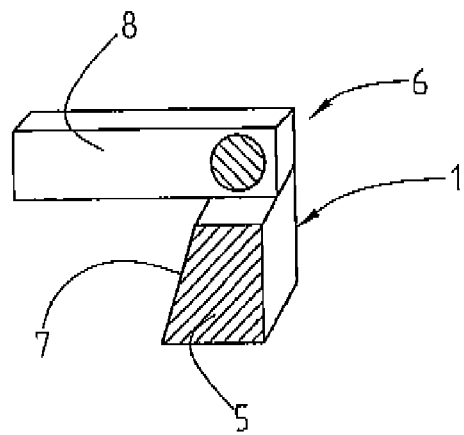
Figure 4:
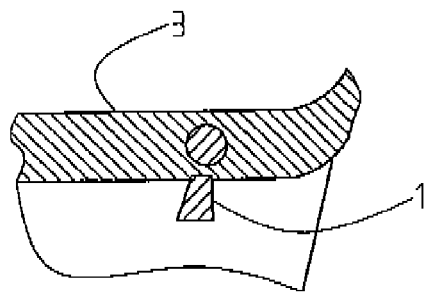
Figure 5:
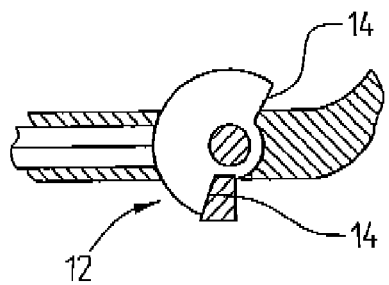
Figure 6:
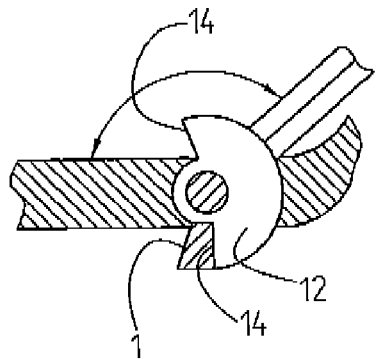
Figure 7:
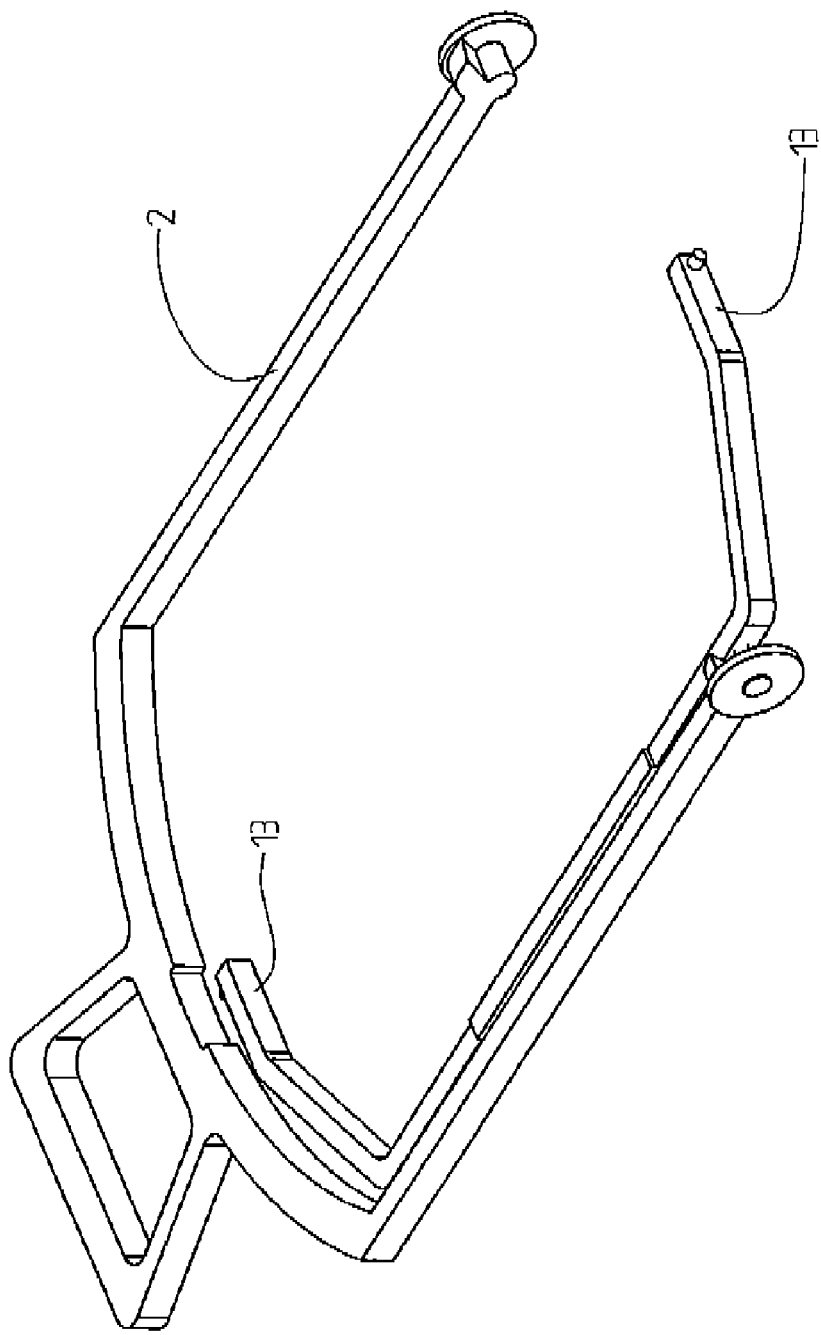

In the following, the invention will be described in more detail, reference being made to an embodiment example shown in the appended drawings, wherein:

FIG. 1a shows a perspective view of a shopping basket with the draw-handle raised and including a device according to the invention, FIG. 1b shows a perspective view of the device according to the invention with the handle lowered, FIG. 2a shows a detailed picture in perspective corresponding to FIG. 1 of the shopping basket with the handle raised, FIG. 2b shows a detailed picture in perspective of the device according to the invention with the handle lowered, FIGS. 3, 4, 5 and 6 show successively as a sequence of views the structure and the function of the device according to the invention, and FIG. 7 shows an exposed perspective view of a draw-handle and a carrying handle in positions corresponding to their mutually mounted positions in the state of rest.

In FIG. 1a, as seen in a perspective view, a shopping basket 10 having a draw-handle 2, in a raised state is shown. It is clearly seen how the draw-handle 2 in the raised state remains is kept at a fixed angle in relation to the plane marking the opening of the shopping basket, which also is parallel to the subjacent floor when the basket stands on the wheels 4 underneath the same. FIG. 1b also shows a perspective picture of a shopping basket 10, here however with the draw-handle 2 in a lowered state, so that the shopping basket is better to be carried by means of the carrying frame/handle 13 (see FIG. 7) that also is arranged adjacent to the opening of the shopping basket 10. Thus, in FIG. 1a as well as FIG. 1b, there is essentially seen how the device according to the invention is intended to work. In FIGS. 2a and 2b as well as FIG. 3, which constitute detailed pictures in perspective of the device according to the invention, this is seen more clearly. The proper device 6 that provides the stop function comprises two separate details, i.e. the draw-handle 2 with crescent-shaped circle segments 12 arranged at the ends thereof and a stop unit 1, where the latter has, on one hand, an upper part 8, which is adapted to be inserted into the edge/frame 3 of the shopping basket 10 so that the edge will conceal parts of the stop unit 1, and on the other hand a lower part 5, which is formed as block having a thickness of between 10 and 20 mm, in this case approx. 10 mm, in the form of a cross-section-wise right angle triangle truncated at the top. One base angle thereof of 90° is found at base angle at the right side thereof in the figure, and the other base angle thereof, an angle of between 45 and 55°, preferably 50°, is found at the left side thereof. The surfaces 7 in the figure that are formed of the vertical face of the block and the oblique face thereof, respectively, constitute so-called stop faces, between which support surfaces 14 of the crescent-shaped circle segments 12 of the draw-handle 2 can move in connection with raising or lowering of the draw-handle 2. The above mentioned angle of 50° may be varied depending on which angle of the surface 7 of the block at the left in the figure that is judged to be most expedient for the different sizes of shopping baskets to be provided. Likewise, the angle between the support surfaces of the crescent-shaped circle segments 12 of the draw-handle may be varied. The thickness of the lower part or block 5 may also be varied depending on the size of the draw-handle in question. The stop unit 1 is manufactured from a fairly hard material, preferably ABS plastic, which is significantly stronger/harder than the thermoplastic that the proper basket part is made from. The intention is that the draw-handle should be possible to be stopped/prevented from turning past the surfaces 7 of the stop unit 1 without the unit 1 yielding.

The respective free ends 11 of the draw-handle 2 are, as mentioned above, fixed by rivets at the edge of the shopping basket outside the stop unit 1. The crescent-shaped circle segment 12 of the ends, preferably also this of ABS plastic, which, by it being fixed pivotably by the riveting, can be turned from a state corresponding to the draw-handle lying stand-by horizontally to a state that in this embodiment corresponds to a turning of 130° (180°-40°) past the left base angle of the block 5 that, mentioned above, is 50° in the in-use state of the draw-handle. Thus, upon use, the shopping basket 10 can, on one hand, be stacked in a conventional way without neither the draw-handle 2 nor the carrying frame 13 interfering with the stacking, and on the other hand be carried by the carrying frame as well as, by means of the draw-handle 2, be pulled along a floor rolling on the wheels thereof. In this state when the draw-handle 2 is active, it is, by means of the stop construction according to the invention, prevented that the draw-handle falls down under the action of gravity and forces the user to lean down in order to grasp the same. The invention should not be regarded as limited by the embodiment example described above but only so by the accompanying claims.

The invention claimed is:

1. A device in a stackable shopping basket of the type that at the underside thereof is provided with wheels and that at the upper part thereof has a draw-handle hingedly fixed to the upper edge of the shopping basket, which draw-handle has the purpose of making it possible to pull the shopping basket behind rolling on the wheels in connection with walking through, for instance, a shop where purchase is made, wherein the draw-handle, in the form of a U-shaped frame, at respective hinged ends thereof comprises a first part of a deflection limiter formed as crescent-like circle segments that are arranged around the hinged ends and Intended to co-operate with a corresponding second part of the deflection limiter that prevents pivoting motion of the circle segments past a certain arc angle and being in the form of two stop blocks, which are fixedly arranged adjacent to an edge of the shopping basket at the attachment points of the hinged ends, wherein a stop unit has, on one hand, an upper part, which is adapted to be inserted into the edge of the shopping basket so that the edge will conceal parts thereof, and on the other hand a lower part having, in the upright in-use state of the shopping basket, vertical and oblique, respectively, stop faces, and is formed as block having a thickness of between 10 and 20 mm in the form of a cross-section-wise right angle triangle truncated at the top and having a base angle of 90° at one side thereof and a base angle of between 45 and 55° at the other side thereof.

2. Device according to claim 1, wherein the limiting or support surfaces of the crescent-shaped circle segments in the angular direction are intended to co-operate with the oblique stop faces of the respective stop block.

3. A device in a stackable shopping basket of the type that at the underside thereof is provided with wheels and that at the upper part thereof has a draw-handle hingedly fixed to the upper edge of the shopping basket, which draw-handle has the purpose of making it possible to pull the shopping basket behind rolling on the wheels in connection with walking through, for instance, a shop where purchase is made, wherein the draw-handle, in the form of a U-shaped frame, at respective hinged ends thereof comprises a first part of a deflection limiter formed as crescent-like circle segments that are arranged around the hinged ends and Intended to co-operate with a corresponding second part of the deflection limiter that prevents pivoting motion of the circle segments past a certain arc angle and being in the form of two stop blocks, which are fixedly arranged adjacent to an edge of the shopping basket at the attachment points of the hinged ends, wherein the details of the deflection limiter, the circle segment-shaped parts thereof at the ends of the draw-handle as well as the stop blocks at the edge of the shopping basket, are manufactured from a material that is harder than the other materials of the shopping basket, and a stop unit has, on one hand, an upper part, which is adapted to be inserted into the edge of the shopping basket so that the edge will conceal parts thereof, and on the other hand a lower part having, in the upright in-use state of the shopping basket, vertical and oblique, respectively, stop faces, and is formed as block having a thickness of between 10 and 20 mm in the form of a cross-section-wise right angle triangle truncated at the top and having a base angle of 90° at one side thereof and a base angle of between 45 and 55° at the other side thereof.

* * * * *